Figure 2:
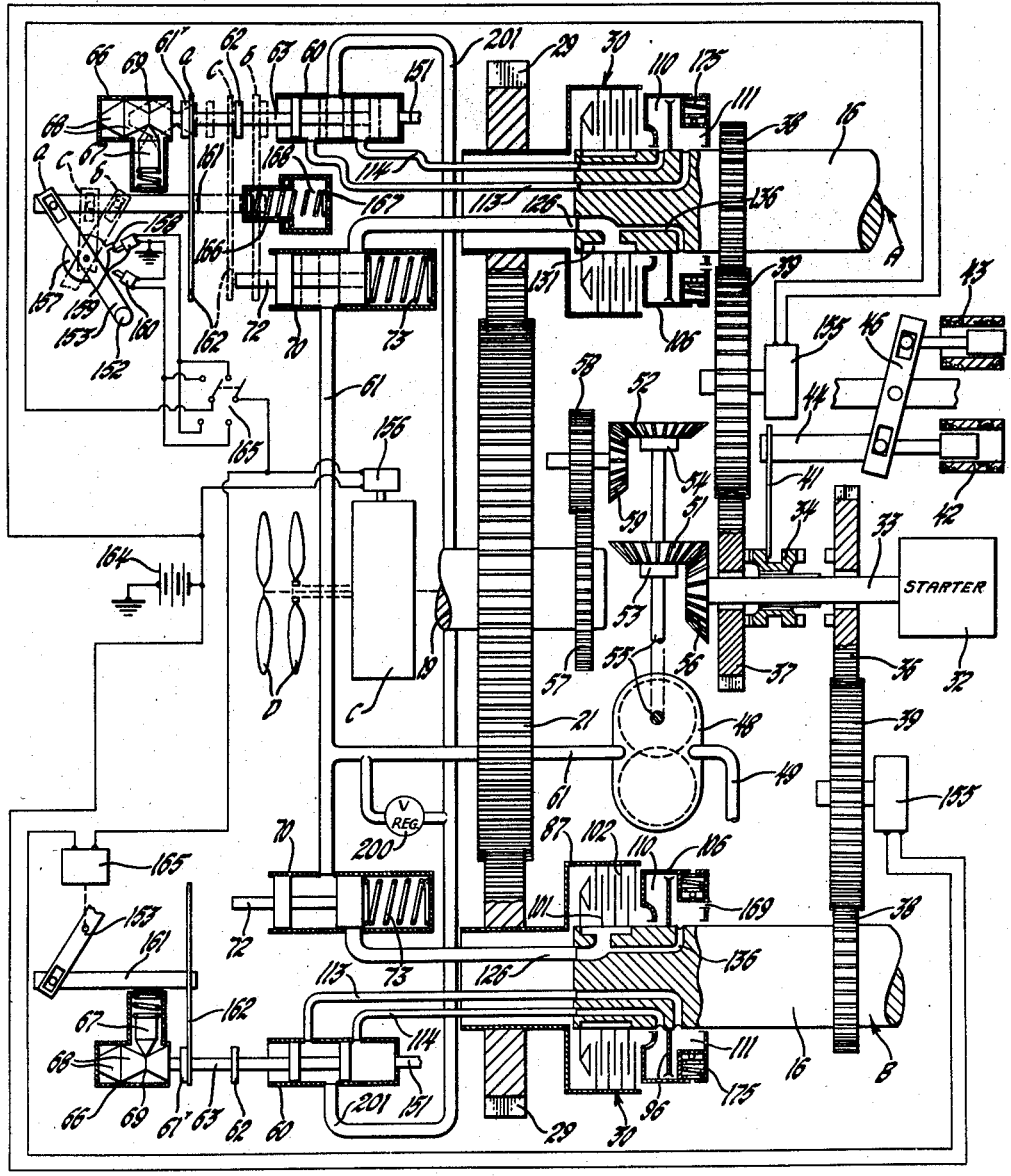

June 17, 1958   V. W. PETERSON ET AL   2,838,913
AIRCRAFT POWER SYSTEM AND CLUTCH CONTROL THEREFOR
Filed July 15, 1950   3 Sheets-Sheet 1
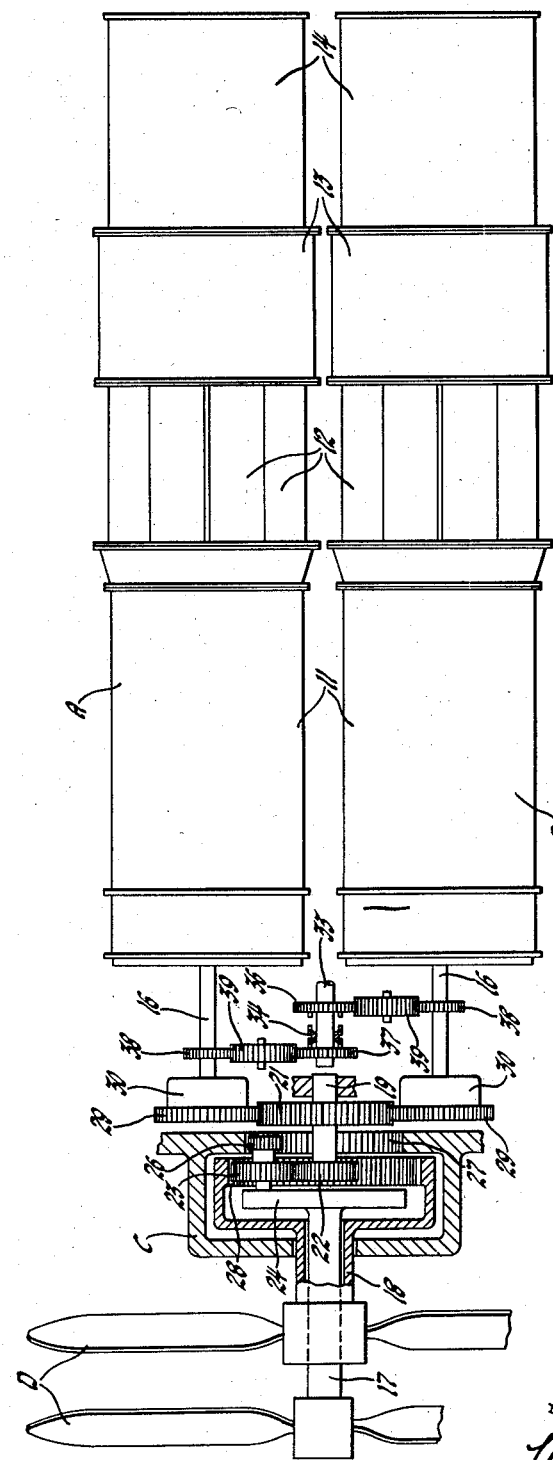
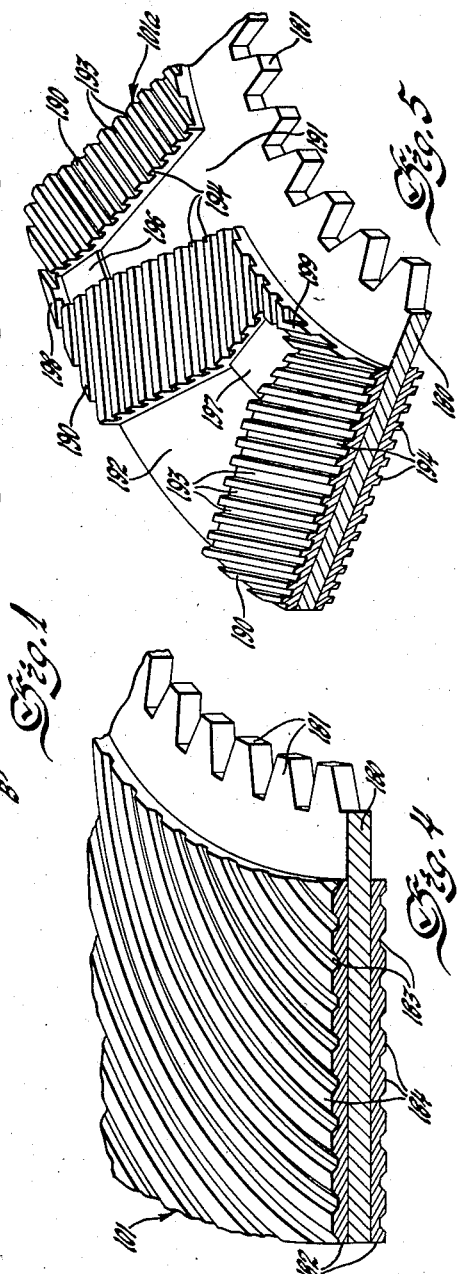
Inventors
Victor W. Peterson &
Herbert H. Schnepel
By Willits, Helwig & Baillie
Attorneys June 17, 1958 — V. W. PETERSON ET AL — 2,838,913
AIRCRAFT POWER SYSTEM AND CLUTCH CONTROL THEREFOR
Filed July 15, 1950 — 3 Sheets-Sheet 2

Inventors
Victor W. Peterson &
Herbert H. Schnepel
By
Willits, Helwig & Baillio
Attorneys June 17, 1958 V. W. PETERSON ET AL 2,838,913
AIRCRAFT POWER SYSTEM AND CLUTCH CONTROL THEREFOR
Filed July 15, 1950 3 Sheets-Sheet 3
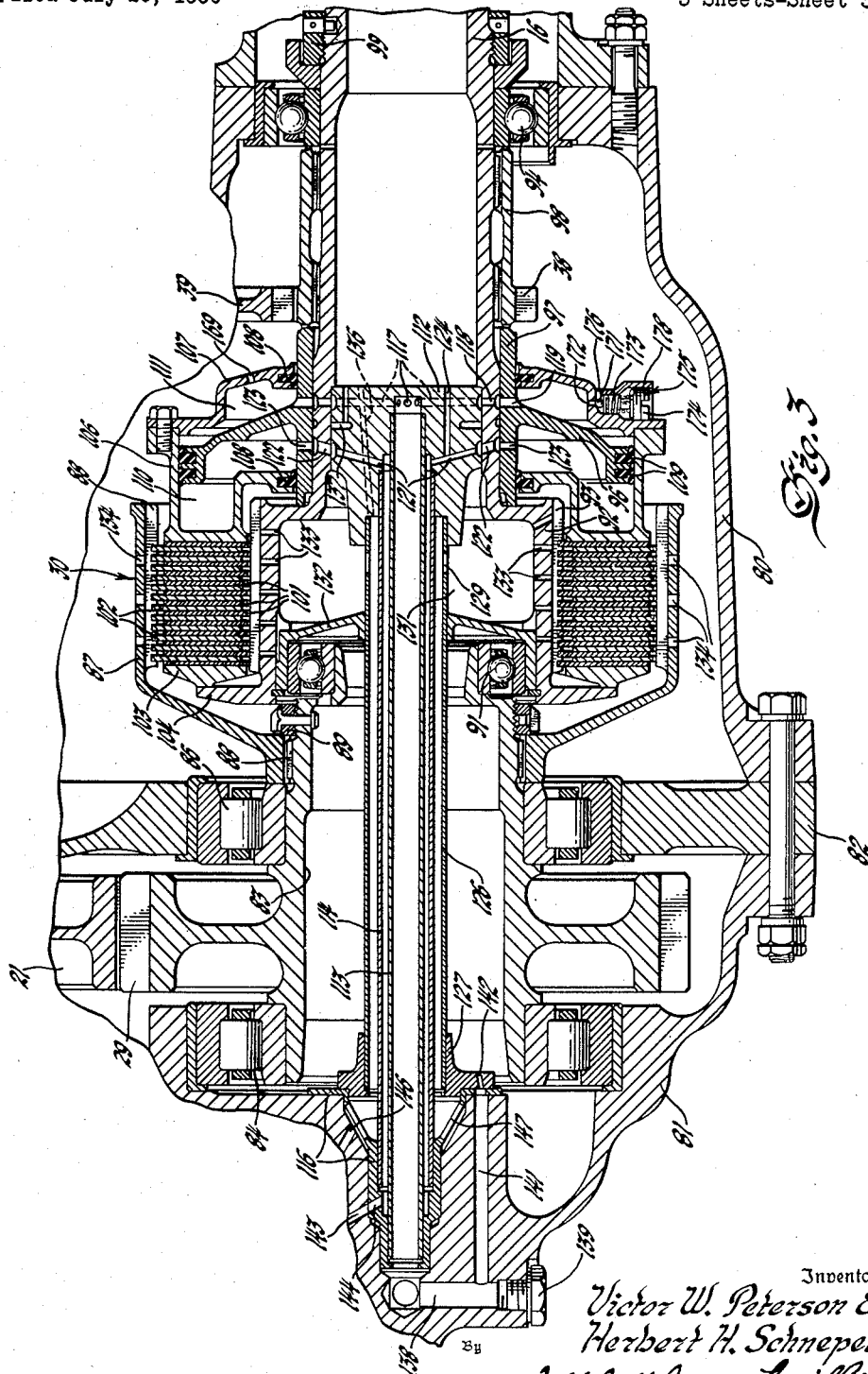
Inventors
Victor W. Peterson &
Herbert H. Schnepel
By
Willito Helwig & Baillio
Attorneys

United States Patent Office 2,838,913
Patented June 17, 1958

2,838,913

AIRCRAFT POWER SYSTEM AND CLUTCH CONTROL THEREFOR

Victor W. Peterson and Herbert H. Schnepel, Indianapolis, Ind., assignors to General Motors Corporation, Detroit, Mich., a corporation of Delaware Application July 15, 1950, Serial No. 174,052

30 Claims. (Cl. 60—97)

This application is a continuation-in-part of our co-pending application Serial No. 147,268, filed March 2, 1950, for Aircraft Power Plant, now abandoned.

This invention relates to aircraft power plants of the turboprop type, and more particularly to power transmissions therefor, including clutching arrangements between the prime mover and the propeller or propellers, and to the relation thereof to starting the engine.

The invention is described herein in terms of its preferred embodiment in an aircraft power plant comprising counter-rotating dual propellers driven by two gas turbine type engines.

The invention provides for clutching of each engine to the propellers. Either engine may be started while declutched, and may then be clutched to the propellers. With one engine operating, the other engine may be clutched to the operating engine and started thereby, either on the ground or in flight. Also, either power section may be started by clutching to the propellers to derive power from the windmilling of the propellers.

The principal objects of the invention are to provide an improved power plant of the turboprop type, particularly one with multiple power units; to provide improved reduction gearing, clutching, and starting arrangements for such power plants; to improve the control systems for starting such power plants and clutching them to the load; and to provide an improved clutch particularly suited for the type of application described above.

A further object is to engage a clutch by relatively light hydraulic pressure to avoid destructive friction and too abrupt clutching, and to utilize hydrostatic pressure due to centrifugal force to provide additional clutch friction to carry heavy full-load torque.

Further objects of the invention are to provide a clutch of very high capacity capable of picking up loads of high inertia with a high input speed to the clutch; a clutch which is cooled during engagement; and a hydraulically operated clutch which is held engaged when in operation even though the supply of hydraulic operating fluid is cut off.

The preferred manner in which the stated objects are achieved, the advantages of the invention, and many further objects of the invention will be apparent to those skilled in the art from the appended description of the preferred embodiment of the invention.

Referring to the drawings:

Figure 1 is a somewhat schematic representation of the general arrangement of a power plant incorporating the invention; Figure 2 is a schematic diagram of the invention; Figure 3 is a partial sectional view of the power transmission structure, the section being taken along the axis of one of the engine shafts and particularly illustrating the clutch and associated mechanisms; Figure 4 is a fragmentary axonometric view of one form of clutch plate; and Figure 5 is a similar view of a second form of clutch plate.

Referring to Figure 1, this figure illustrates a power plant comprising two gas turbine engines or power units A and B arranged side by side, and coupled through gearing identified generally as C to dual counter-rotating propellers D. The details of the internal structure of the engines are immaterial to the invention. They may be of a conventional type, comprising a compressor 11, combustion chambers 12, a turbine 13, and an exhaust cone 14. Each engine delivers power through an output shaft 16.

The details of the propellers D are likewise immaterial to the invention. The propellers are mounted on concentric shafts 17 and 18, which are driven at the same speed in opposite directions by elements of the gearing C.

The gearing C comprises an input shaft 19 on which is fixed a driving gear 21 and a pinion 22. The pinion 22 meshes with a planet gear or gears 23, mounted on a spider 24 fixed on propeller shaft 17. A second planet gear 26, rotating with the planetary gear 23, meshes with an internal gear 27 fixed in the gear casing. The planetary gear 23 meshes with an internal gear 28 fixed on the propeller shaft 18. This gearing is such as to drive the propellers D in opposite directions at the same speed and at a reduced speed with respect to input shaft 19. The input gear 21 meshes with an output gear 29 on each of the shafts 16, the gears 29 being coupled to the shafts 16 by clutches 30, which will be described more particularly. There is a double speed reduction, one stage of reduction in the gears 29, 21, and one in the epicyclic gearing. The overall reduction is about sixteen to one.

The overall reduction is determined by engine and propeller characteristics and the division of this reduction between the two stages is a matter of design. In order for the shafts 17 and 18 to rotate at equal speeds, the ratio of the pitch radii of gears 27 and 26 must be twice that of the pitch radii of gears 23 and 28. The actual values of these ratios will vary with the reduction ratio of the epicyclic gearing.

A starter motor 32 (Figure 2), including an overrunning clutch or the equivalent, drives a shaft 33, on which is splined a sliding toothed clutch element 34, which may be engaged with mating clutch elements of either of two gears 36 and 37, rotatable with respect to the shaft 33. The gears 36 and 37 are coupled to gears 38 on the motor shafts 16 through idler gears 39.

Referring now to Figure 2, the starting clutch 34 may be shifted to couple the starter with either gear 36 or gear 37, by appropriate mechanism such as a sliding fork 41, actuated into either extreme position by solenoids 42 and 43 respectively, which may be energized by a suitable circuit (not shown). The armature of solenoid 42 may be coupled directly to the shifting fork by rod 44, and the armature of solenoid 43 may be coupled to the rod 44 by a lever 46. An overcenter detent mechanism (not illustrated) may be provided to maintain the clutch 34 in either position of engagement.

The clutches 30 are engaged and disengaged by a hydraulic system, and are supplied with oil for cooling. Oil for both these purposes is supplied by a pump 48 supplied from a reservoir (not shown) through a conduit 49. The pump 48 may also supply lubricating oil to the reduction gear. The pump 48 is driven by the shaft 33 or the propeller drive shaft 19, being coupled to both these through overrunning clutches and suitable gearing. The illustrative gearing shown comprises bevel gears 51 and 52 coupled to the pump shaft 55 by overrunning clutches 53 and 54 respectively, gear 51 being driven by a bevel gear 56 on the starter shaft 33, and gear 52 through a gear train comprising gear 57 on shaft 19 and intermediate gears 58 and 59 on an idler shaft. The ratios of the gears are preferably so selected that when the propeller is clutched to the power unit the pump is driven by the propeller and clutch 53 overruns slightly. The pump 48 supplies oil to a clutch actuating valve 60 and a clutch cooling valve 70 for each engine through conduit 61 and suitable valves and conduits, to be described.

Before proceeding to the description of these valves and the control systems therefor, the structure of the clutches 30 will be described, with reference particularly to Figure 3. Figure 3 illustrates one of the clutches 30 which couples an engine output shaft 16 to the gear 29, which, in turn, drives gear 21, a portion of which is shown. The starter gear 38, which is splined to shaft 16, and a portion of the idler gear 39 are shown.

These structures are enclosed in a housing, shown in part, which includes a clutch housing 80, a gear housing 81, and a transverse plate 82 bolted between the housings 80 and 81. Gear 29 is integral with a hollow shaft 83 mounted in bearings 84 and 86, the shaft 83 extending into housing 80. The driven member 87 of the clutch 30, which is in the form of a drum provided with internal splines 88, is formed with a flange splined to the shaft 83 and 88 and retained by threaded ring 89. The shaft 83 is also formed with a reduced end portion on which is mounted a ball bearing 91 which supports the driving clutch element 92 rotatably on the shaft 83. The driving clutch element 92, which is of cylindrical form, and which is provided with splines 93 on its outer surface, constitutes an enlarged end portion of the shaft 16. Shaft 16 is further mounted in a ball bearing 94 in the end of the housing 80.

The annular piston 96 of the clutch actuating cylinder comprises a sleeve 97 on the shaft 16. The sleeve 97 abuts the end of the driving clutch drum 92, and is in turn abutted by a sleeve 98 integral with gear 38, which is splined to the shaft. The inner race of the bearing 94 bears against the end of the sleeve 98, and the whole assembly is retained on shaft 16 by a threaded ring 99. It will be understood that the shaft 16 is not ordinarily the actual shaft of the power unit as indicated schematically in Figure 1, but is connected to the unit shaft.

The clutch 30 is of the multiple-plate type, provided with two sets of annular plates disposed alternately, with the plates 101 of the driving set formed with internal splines engaged with the splines of the driving clutch element 92 and the driven clutch plates 102 formed with external splines engaged with the splines 88 of the driven clutch element. The innermost of the driving clutch elements is backed up by ring 103, which bears against a flange 104 at the inner end of the driving clutch drum 92. The clutch plates are pressed into engagement by an annular cylinder 106 which reciprocates on the outer surface of the sleeve 97. Cylinder 106 is fitted with a head 107 and the ends of the cylinder are provided with seals 108 engaging the sleeve 97. The cylinder 106 is divided into two chambers 110 and 111 by the fixed piston 96, which is provided with fluid seals 109 around its circumference. As will be apparent, when fluid under pressure is admitted to the inner chamber 110 of the cylinder 106 the clutch plates are engaged, and when fluid is admitted to the outer chamber 111 the clutch is released.

With the clutch disks in frictional engagement, power is transmitted from shaft 16 and the driving clutch member 92 thereon through the frictional contact of the disks to the driven clutch member 87, shaft 83 on which it is mounted, and the output gear 29, which in turn drives the gear 21 which provides the input to the reduction gear C. Of course, when in flight, the rotation of the propellers may drive back through the clutch to bring the engine up to starting speed.

Hydraulic operating fluid for the clutch is supplied through a fitting 112 pressed into the end of the shaft 16 and concentric tubes 113 and 114 extending from the fitting 112 to a non-rotating bushing 116 in the end wall of the housing section 81. The block 112 rotates with the shaft 16 and the tubes float in the block and in the bushing to permit free rotation of the shaft. Fluid to release the clutch is conducted through the tube 113 and radial passages 117 in the fitting 112, 118 in the shaft 16, and 119 in the piston sleeve 97. Circumferential grooves are provided in the outer surface of the block 112 and the shaft 16. Fluid to engage the clutch is transmitted through the annular passage between the tubes 113 and 114 and radial passages 121, 122, and 123, in the block 112, shaft 16, and piston sleeve 97, respectively, in a similar manner. One of the passages 121 is provided with a restricted passage 124 into the interior of the hollow shaft 16 for lubrication of the bearing 94.

Cooling oil for the clutch is supplied through the annular space between the tube 114 and tube 126 concentric therewith, one end of which floats in a recess in the fitting 112 and the other end of which floats in a flange 127 fitted in the bushing 116. Passages 129 in the tube 126 discharge the cooling fluid into an annular chamber 131 defined by the driving clutch member, the plug 112, and a disk 132 mounted in the driving clutch member. There is clearance between disk 132 and tube 126. When oil is supplied to the chamber 131, the supply pressure and centrifugal force drive the oil through radial passages 133 in the driving clutch members which discharge the oil between the clutch disks 101 and 102. The driven clutch drum 87 is formed with outlets 134 through which the oil is vented into the housing 80. The cooling oil conduit is also connected to the chamber 111 through a drilled passage 136 communicating with one of the radial passages 117. Seepage along the outer surface of the plug 112 between the passages 117 and 121 is received in an annular groove 137 vented to the interior of the shaft 16.

Clutch actuating and cooling fluid is supplied to the tubes 113, 114, and 126 through suitable ducts in the housing section 81. The clutch releasing conduit 113 is supplied through a passage 138 illustrated as closed by a plug 139, which is removed when the external conduits are fitted. A branch passage 141 and drilled opening 142 in the bushing 127 provide a jet of oil inside the shaft 83 for lubrication of the bearings 84 and 91. The interior of tube 114 is supplied through aligned passages 143 in the casing and 144 in the bushing 116. The cooling oil is supplied through a passage 146 in the casing and openings 147 in the bushing. The conduits 138, 143, and 146 in the housing may be connected in any suitable manner to the valves which supply the clutch operating and cooling oil.

Proceeding to a description of the control system for the clutches, with reference to Fig. 2, it may be noted that the clutches 30 are shown in a schematic fashion in this figure; however, the relation of the schematic to the physical structure shown in Fig. 3 will be apparent to those skilled in the art, particularly in view of the identification of the principal elements of the clutch by reference numbers in Fig. 2.

As previously stated, the pump 48, which is operated whenever either the power unit to which the starting shaft 33 is clutched or the propeller drive shaft 19 is rotating, supplies fluid to an actuating valve 60 and a cooling control valve 70 for each clutch. The controls for the two clutches are identical. It will be understood that the fluid supply system is provided with relief or unloading valves (not shown), which may be of conventional type, and that the pump 48 may supply lubricating oil under pressure to the gears and bearings of the reduction gear in any suitable manner, in addition to supplying oil to the clutches. The valves 60 and 70 may be of the well-known spool type, as illustrated, or any other suitable type.

The line 61 from the pump branches and communicates directly with the coolant control valves 70. The engagement control valves 60 are supplied from line 61 through a pressure-regulating valve 200 of any suitable type and branch conduits 201. The purpose of the regulating valve is to ensure substantially constant oil pressure for engagement and disengagement. By way of example, in the preferred embodiment of the invention, the normal output of pump 48 is at about 180 pounds per square inch. When cooling oil is supplied to the clutch, the large flow of coolant reduces the pressure to about 40 or 50 pounds per square inch. The output of valve 200 is at about 20 pounds per square inch, and is thus substantially independent of fluctuations in the pump output pressure.

The system is illustrated in Fig. 2 in condition for starting one motor with the clutches 30 disengaged and the starter 32 clutched to the shaft 16 of the power unit A. Under these conditions, flow of fluid from the pump is cut off at the valves 60 and 70. The engagement chambers 110 of the clutch actuating cylinders 106 are vented to the return line 151.

The system includes means to ensure that the powered member is operating at suitable speed before the clutch is engaged, and to ensure the continuance of the supply of cooling fluid during the period of slip of the clutch. These means, which may be termed supervisory controls, may be of various forms within the scope of the invention as long as they satisfy the requirements stated above. By way of illustrating the principles of the invention, a simple supervisory control arrangement is illustrated in Fig. 2.

The actuating valve 60 and the cooling valve 70 for each clutch 30 are both operated by a common mechanism. This mechanism includes a rod 161, guided for reciprocating movement, on which is mounted a plate 162. The plate 162 is formed with a fork engaging with lost motion between enlargements 61' and 62 of the plunger shaft 63 of valve 60. The plate 162 also engages the end of the plunger 72 of valve 70. Rod 161 is reciprocated through a pin and slot connection by a pivoted lever 153, which may be actuated in any suitable manner, as by a handle 152. It will be noted that the lever 153 and the supervisory controls therefor are shown completely on Fig. 2 only for the power unit A. The corresponding structure of the power unit B is indicated in a more schematic fashion.

When the lever 153 is in the solid line position indicated by $a$, valve 60 is held in the clutch-releasing position, in which fluid from the supply line 201 is supplied through the conduit 113 to the clutch releasing chamber 111, and the clutch-engaging chamber 110 is vented to the return line 151. In this position the plate 162 is clear of the stem 72 of the coolant supply valve 70, and this valve is held closed by the spring 73.

To engage the clutch of the power unit A, for example, the lever 153 is rotated to the position indicated as $b$, shifting the plate 162 to the $b$ position. The connections to the chambers 110 and 111 are reversed, chamber 110 being filled to engage the clutch and chamber 111 being vented through the open end of the valve 60, which may be connected to a return line (not shown). In the $b$ position, the coolant valve 70 is opened against the force of the spring 73 to supply cooling fluid to the clutch.

When the load has been brought up to speed, the actuating lever 153 and thereby the plate 162 are shifted to the $c$ position, in which the spring 73 closes the valve 70 to shut off the cooling fluid. Valve plunger 63 is retained in the clutch-engaging position because of the lost motion between the plate 162 and the enlargements 61' and 62 on the plunger and the action of a detent mechanism 66 including a spring-urged detent 67 cooperating with the tapered surface 68 of the valve plunger 63.

To disengage the clutch, the lever 153 is moved back to the initial or $a$ position, which shifts the plunger 63 so that the detent 67 engages in the notch 69, venting the clutch-engaging chamber and supplying fluid under pressure to the releasing chamber.

As will be apparent, it will be possible for the pilot or engineer of the aircraft to control the clutches directly by manual actuation of the levers 153 and it will also be apparent that some form of remote control operating mechanism for the levers 153 could be installed if desired. Since the details of such remote actuating means are not material to the present invention, it is deemed preferable, in the interest of conciseness, to omit a description of such remote controls.

In practice, however, whether the operation of the lever 153 be direct or by remote control, it is highly desirable to include a supervisory control to prevent improper actuation of the clutch controlling and cooling valves, as previously stated.

The exemplary supervisory control system, illustrated in Figure 2, comprises a speed responsive device 155 driven by each power unit, as, for example, by the idler gears 39, and a speed responsive device 156 driven from the reduction gearing C in such manner that its speed is proportional to the rotational speed of the propellers D. The speed responsive devices 155 may be centrifugal switches which close at about 80% rated engine speed, or, say, at 11,000 R. P. M. The speed responsive device 156 may be a centrifugal switch which closes at a propeller speed which corresponds to the same value of engine R. P. M. These speed responsive devices control the engagement of the clutch to prevent engagement below a suitable engine or propeller speed, and also control the closing of the coolant valve to ensure that the cooling oil is supplied for a sufficient time. A disk 157, provided with a projecting dog 158, is mounted to rotate with the lever 153. A solenoid-operated latch 159 is engaged by the dog 158 so that the lever cannot be moved from the $a$ position unless solenoid 159 is energized. A second solenoid-operated latch device 160 permits free movement of the lever to the $b$ position, but holds the lever in the $b$ position until the solenoid 160 is energized to retract the latch. These solenoids are energized from a battery 164 through the switches 155 and 156 and a double pole double throw switch 165 for each clutch. When the switch 165 is open, the solenoids cannot be energized, and the clutch lever cannot be operated to engage the clutch. When a power unit, such as unit A, is in operation, the switch 165 is closed on the lower contacts so that the solenoid 159 is energized when the power unit reaches a speed of 11,000 R. P. M. In this position of the switch 165, the latch solenoid 160 is energized from the speed sensitive switch 156, which closes when the propeller comes up to a corresponding speed. Thus, when the power unit has been brought up to a speed sufficient to carry the load of starting the propellers, the latch 159 is released and the lever may be moved to shift the actuator 161 to $b$ position, in which it is held by the latch device 160. In the latter part of this movement, the actuator 160 presses a plunger 166 mounted in a fixed guide 167 against the force of the spring 168.

When the propellers come up to speed, which indicates that the engagement of the clutch is complete, the switch 156 closes and energizes solenoid 160. This releases the lever 153, whereupon spring 168 and plunger 166 return the lever to the $c$ position, cutting off the coolant. The lever remains in this position until it is desired to declutch, when it may be shifted back to the $a$ position, the latch 158 being formed to permit counterclockwise movement of the lever.

By closing the switch 165 in the upper position, the circuit is set up for starting a power unit from a windmilling propeller or a power unit in operation. In this position, the clutch engages when the propeller is up to speed, and the supply of cooling oil is terminated by release of the latch 160 when the power unit being started synchronizes with the propeller.

It will be apparent that other arrangements may be provided to ensure supply of coolant for sufficient time, as for example, a delayed action mechanism to shift the actuator from the $b$ position to the $c$ position after a time interval sufficient to ensure synchronization of the clutch.

Referring again to Fig. 3, since the coolant conduit 126 is connected to the disengaging chamber 111 through the passage 136, fluid is supplied to the chamber 111 so that this chamber remains full as the clutch is engaged. The fluid in the chamber 111 is under no significant pressure except that due to centrifugal force, which is substantial at the relatively high speeds (over 10,000 R. P. M.) of the mechanism. Since the chambers 110 and 111 are both full of fluid while the load is being picked up, the centrifugal forces are balanced and the engaging force is due to the hydrostatic pressure from the pump and regulating valve 200 acting on the inner end of the cylinder 106.

The chamber 111 is formed with a restricted vent outlet 169 spaced from the sleeve 97. After the cooling oil is shut off the disengagement chamber 111 is partially drained through the orifice 169, leaving fluid in this chamber only radially outward from the outlet. This diminishes the centrifugal effect back pressure against the cylinder head 107, thus increasing the clutch-engaging force.

The cylinder head 107 is provided with one or more spring-loaded relief valves 175 which further vent the fluid from the disengaging chamber 111 when the assembly approaches full speed as, for example, at 12,500 R. P. M. The relief valve may be of conventional construction and may be mounted in a projection 178 of the cylinder head. In its preferred form, the valve comprises a ball 171 seating against a radial opening 172 in the cylinder head and held seated by a spring 173 abutting a retainer 174. When the centrifugal force reaches the desired level, the combination of centrifugal force on the valve parts and on the fluid lifts the ball 173 from the seat and vents the fluid through the passage 172 and an outlet 176 in the valve body. As will be apparent, since the entire chamber 110 is filled with fluid and only the outer portion of the chamber 111 is filled, unbalanced hydrostatic forces due to centrifugal action tend to hold the clutch engaged. The parts are so proportioned that this effect is sufficient to retain the clutch 30 engaged even though the pressure in the hydraulic fluid supply system be lost. If the power plant is stopped, the fluid in the engaging chamber will bleed out through the passage 124 to release the clutch.

Ordinarily, the propeller is set at zero pitch angle when the clutch is engaged during a ground start, which minimizes resistance to rotation of the propeller. The relatively light pressure, about 20 pounds per square inch, from the regulating valve, effects a soft engagement of the clutch so that the load is picked up gradually without undue loading of the power unit, the clutch, or other elements of the power plant. This pressure provides, in an illustrative example, about 400 pounds axial thrust on the clutch plates. This is suitable for picking up the load, whether it be the propeler or a power unit.

However, the regulated pressure does not provide sufficient friction to prevent slipping of the clutch under normal load conditions of the power plant with the propeller pitched to generate thrust. This thrust is supplied by unbalanced centrifugal force in the chambers 110 and 111 after the chamber 111 is partially emptied by the valves 175. The position and pressure setting of these valves may be chosen to effect any desired degree of centrifugal unbalance, and, in the illustrative example referred to, the axial thrust on the clutch plates after the unit reaches 12,500 R. P. M. and the disengagement chamber is vented, is about 5000 pounds, or over ten times the force due to the pressure of the external oil supply.

This high axial pressure provides ample friction to carry full torque of the power unit, and, since it is applied only when the clutch is synchronized, is not harmful to the clutch. The centrifugal effect increases with speed of the power unit and therefore generally in a commensurate manner with the resistance of the propeller, which also tends to increase with speed.

The clutch characteristics are particularly suitable to a gas turbine engine, in which the normal operational speed is high, generating high centrifugal thrust in a relatively small cylinder, and in which the minimum or idling speed is also high, usually over half the maximum speed. The clutch characteristics also are particularly well adapted to pickup of loads such as propellers or turbine engines in which the low-speed torque requirements are low and the principal load as the clutch is engaged results from inertia.

The system of gas turbine engine, clutch, and propeller is thus particularly well integrated and possessed of most satisfactory operating characteristics. It will be apparent, however, that the clutching system is advantageously adaptable to other types of prime movers and loads than those described herein.

As previously stated, the clutches are designed to permit picking up the high-inertia load of the propellers or of a stationary engine at high rotational speeds. The clutches are able to accelerate the propellers to 80 percent rated speed within 8 seconds and are able to accelerate a standing engine at the rate of 1000 revolutions per minute per second. As will be apparent, the engagement of the clutches under such conditions results in some hundreds of slip rotations of the clutch. Such heavy demands on a structure which must be light and compact require provisions for cooling the clutch during engagement. The provisions for cooling, so far as they involve supply of cooling oil to the clutch, have been described. However, success of the cooling depends also upon the structure of the clutch plates, two preferred forms of which are shown in Figures 4 and 5 respectively. These figures show the driving clutch plates which are splined to the inner clutch drum 92.

Referring first to Figure 4, which shows a portion of one form of disk, the disk comprises an annular steel plate 180 provided with teeth 181 on the inner margin for engagement with the splines 93. Each face of the disk 180 is covered with an annular plate 182 of friction material, preferably sintered bronze. The friction material is formed with a large number of spiral grooves 183 dividing the surface into a number of spiral lands 184 which are the friction surfaces. The driven clutch plates 102 are not illustrated in detail since these disks have plain faces without grooves or ribs. Preferably the driven clutch disks are very slightly dished to promote smooth engagement of the clutch.

As will be apparent, the grooves 183 provide a plurality of generally radial channels through which cooling oil is circulated and by which cooling oil also is supplied to the faces of the clutch to lubricate them during the period of slip. By this arrangement, thorough lubrication and a copious supply of cooling fluid immediately adjacent the rubbing faces, where heat is generated, are assured.

Figure 5 illustrates a second form of driving clutch element identified as 101a in which the objective of securing highly efficient lubrication and highly effective cooling of the clutch plate is achieved in a somewhat different manner. The steel disk 180 may be similar to that previously described, with splines or teeth 181. The friction facing 190 is divided into a number of sections with fluid supply channels 191 and discharge channels 192 disposed alternatively between the friction areas. The friction areas are formed with grooves 193 and ribs 194 extending generally helically outwardly from the supply channels 191 to the discharge channels 192. As will be noted, the supply channels converge toward the outer margin of the disk and the outlet channels diverge. Fluid entering the channels 191 under the action of the pump 48 and of centrifugal force is distributed among the grooves 193 assuring an adequate distribution of lubricating and cooling fluid at all portions of the friction surface of the clutch. The several sections 192 of the friction material are tied together at the outer and inner margins alternatively, the tying strips such as 196 and 197 further constricting the smaller ends of the channels 191 and 192, the ends of which are partially closed by narrow ribbed sections 198 and 199. The clutch plate illustrated in Fig. 5 is the subject matter of U. S. Patent No. 2,690,248, issued September 28, 1954, of Charles J. McDowall.

Although it is believed that the manner of operation and characteristics of the system disclosed herein will be apparent to those skilled in the art from the foregoing, the operation may be reviewed briefly.

Assuming that both engines are standing idle, the clutch 34 is shifted to couple the starter to either power unit. As the engine is accelerated by the starter, its operation becomes self-sustaining, and at about 11,000 R. P. M., the unit develops sufficient power to assume the propeller load. With the switch 165 closed on the lower contacts, when the speed-responsive switch 155 closes, the lever 153 may be operated to shift the valves 60 and 70 to engage the clutch and supply cooling oil thereto. When the propellers have been accelerated, speed-responsive switch 156 releases the lever, and spring 168 shifts it to shut off the coolant, the valve 60 remaining in the clutch-engaging position.

With one power unit in operation, the clutch 30 of the other power unit may be engaged by closing its switch 165 so that it is brought up to speed through the previously engaged clutch 30 and the intermediate gearing, the switch being thrown so that the coolant is cut off when the motor being started is brought up to speed.

In flight, when power demand is reduced, one power unit may be declutched and stopped, the propellers being driven by the operating unit.

If both the power units are shut down during flight, the propellers may be unfeathered and allowed to windmill freely until they develop a high rotational speed, when one clutch may be engaged to bring a power unit up to firing speed by the action of the apparent wind on the propellers.

Whenever the clutches are engaged, oil is supplied to cool them. Since the period of slip of the clutches is of short duration, only a few seconds, a quite substantial heating of the oil may be tolerated, and in fact it is contemplated that this heating may be of the order of 200° F. locally during the period of engagement, which may be tolerated since the clutches are operated only at intervals and the oil may cool between applications of the clutches. Approximately 90% of the frictional heat is absorbed by the oil.

Since the pump 48 is driven either by the propellers or a running power unit, and the engagement of the clutches is speed-controlled, the clutches cannot be engaged except when a sufficient quantity of cooling fluid is available from the pump.

The remarkable characteristics of the clutch may be more readily apparent from the fact that a clutch in accordance with the invention designed for use with a power unit of over 2,500 shaft horsepower is only approximately one and a half times the size of the illustration in Figure 3.

It will be apparent to those skilled in the art that many modifications of the system and components thereof may be made within the scope of the invention, which is not to be considered as limited by the detailed description of the preferred embodiment of the invention.

We claim:

1. In combination, a driving shaft, a driven shaft, a friction clutch between the shafts adapted to couple the shafts during rotation of the driving shaft, means connected to the clutch to engage the clutch, a hydraulic motor connected to the clutch for providing thrust to disengage the clutch, and means responsive to rotation of the driven shaft above a predetermined speed for increasing the clutch-engaging force and thereby the friction of the clutch to provide full-load torque-carrying capacity, the last-named means including means for at least partially venting the hydraulic motor.

2. In combination, a driving shaft, a driven shaft, a friction clutch between the shafts adapted to couple the shafts during rotation of the driving shaft, means to engage the clutch, hydraulic motor means to disengage the clutch, valve means for supplying fluid under limited pressure to the motor means, the motor means being mounted for rotation with one of the shafts so that rotation thereof develops centrifugal fluid forces on the fluid in the motor means tending to disengage the clutch, and means to empty at least partially said motor means of fluid after engagement of the clutch to reduce the thrust due to centrifugal force and thereby increase the torque capacity of the clutch.

3. In combination, a driving shaft operable at a predetermined speed, a driven shaft, a friction clutch between the shafts adapted to couple the shafts during rotation of the driving shaft, means connected to the clutch to engage the clutch, hydraulic motor means connected to the clutch to disengage the clutch, means for supplying fluid under limited pressure to the motor means, the motor means being mounted for rotation with one of the shafts so that rotation thereof develops centrifugal fluid forces on the fluid in the motor means tending to disengage the clutch, and means to empty at least partially said motor means of fluid operable in response to rotation of said driven shaft substantially at said predetermined speed to reduce the thrust due to centrifugal force and thereby increase the torque capacity of the clutch.

4. A power plant comprising, in combination, a power unit, an output shaft; a clutch, including a driving member and a driven member, coupling the power unit to the shaft; a hydraulic motor for actuating the clutch comprising a cylinder rotatable with one of the said members and a piston, the cylinder and piston defining a clutch-engaging chamber and a clutch-releasing chamber; means for supplying cooling fluid to the clutch including a first valve; means for energizing the hydraulic motor including a second valve; means for opening the first valve to supply cooling fluid to the clutch during the period of slip of the clutch and the second valve to engage the clutch; and a third valve responsive to rotation of the power unit to vent the clutch-releasing chamber at a predetermined speed so that centrifugal force on the fluid in the clutch-engaging chamber is effective to hold the clutch engaged.

5. A clutch comprising a driving member, a driven member, a friction clutch between the members, a hydraulic cylinder assembly rotatable with one of the members and coaxial therewith, the cylinder assembly being coupled to the clutch to effect engagement and release thereof and defining a clutch-engaging chamber and a clutch-releasing chamber, means for supplying fluid under pressure selectively to the chambers, a restricted outlet for the releasing chamber in a zone intermediate the axis and the periphery of the cylinder assembly, a passage from the releasing chamber more remote from the axis than the outlet, and a centrifugal-force-responsive valve controlling the said passage.

6. A clutch comprising a driving member, a driven member, a friction clutch between the members, a hydraulic cylinder assembly rotatable with one of the members and coaxial therewith, the cylinder assembly being coupled to the clutch to effect engagement and release thereof and defining a clutch-engaging chamber and a clutch-releasing chamber, means for supplying fluid under pressure selectively to the chambers, a restricted vent for the engaging chamber adjacent the axis of the members, a restricted outlet for the releasing chamber in a zone intermediate the axis and the periphery of the cylinder assembly, a passage from the releasing chamber more remote from the axis than the outlet, and a rotation-responsive valve means controlling the said passage.

7. In combination, a driving shaft, a driven shaft, a friction clutch between the shafts adapted to couple the shafts during rotation of the driving shaft, means to engage the clutch, a hydraulic motor for providing thrust to disengage the clutch, the motor including an expansible chamber rotatable with one of the said shafts, and means for increasing the clutch engaging force and thereby the friction of the clutch to provide increased torque carrying capacity above that available during engagement of the clutch, the means for increasing the clutching force comprising a bleed opening in the expansible chamber spaced from the axis of the shaft, means for supplying fluid to the chamber at a rate at least equal to the rate of loss of fluid through the bleed opening, means responsive to rotation of one of the shafts to terminate the said supply of fluid so that the chamber is at least partially emptied through the said bleed opening, a vent in the chamber spaced from the axis of the shaft, a valve in the vent, and means responsive to rotation of the chamber for opening the valve.

8. An aircraft propulsion plant comprising, in combination, a propeller assembly, two power units, a gear unit connecting the power units to the propeller assembly, a clutch between each power unit and the gear unit, a starter, means for coupling the starter to either power unit, hydraulic means for engaging the clutches, a pump, means for driving the pump by the starter and the power unit coupled thereto, means for driving the pump by the propeller assembly, a control valve supplied from the pump and controlling the hydraulic means, and means responsive to the speed of the power unit for conditioning the control valve for engagement of the corresponding clutch.

9. A power transmission mechanism comprising, in combination, a driving shaft, a driven shaft, a clutch between the driving and driven shafts, hydraulic means for engaging the clutch, a pump, means for driving the pump by the driving shaft, means for driving the pump by the driven shaft, a control valve supplied from the pump and controlling the hydraulic means, means responsive to the speed of the driving shaft for conditioning the control valve for engagement of the clutch, and means responsive to the speed of the driven shaft for effecting engagement of the clutch regardless of the speed of the driving shaft.

10. A power transmission mechanism comprising, in combination, a driving shaft; a driven shaft; a clutch, including a driving member and a driven member, coupling the driven shaft to the driving shaft; a hydraulic motor for actuating the clutch comprising an annular cylinder rotatable with one of the said members and a piston, the cylinder and piston defining a clutch-engaging chamber; means for supplying cooling fluid to the clutch including a first valve; means for energizing the hydraulic motor including a second valve; means for opening the first valve to supply cooling fluid to the clutch and the second valve to engage the clutch, and means for closing the first valve after the period of slip of the clutch is terminated.

11. A power transmission mechanism as recited in claim 10 in which the last-named means is responsive to the rate of rotation of the driven member of the clutch.

12. A clutch comprising, in combination, a driving member, a driven member, a hydraulic motor rotatable with one of the members and comprising relatively movable means defining opposed chambers, the relatively movable means being coupled to the members to control engagement of the clutch, means for filling both chambers with fluid before engagement of the clutch, the proportions of the chambers being such that opposed thrusts on the means due to centrifugal force on the fluid in the chambers are substantially balanced, means for applying a static head to the fluid in one of the chambers to create a thrust operative to engage the clutch, and means responsive to the speed of rotation of the motor operative upon increase in said speed above a predetermined value to reduce the fluid content of the other chamber to provide a centrifugally-created unbalanced thrust operative to increase the engaging force of the clutch.

13. In combination, a friction clutch comprising driving and driven members, a double-acting hydraulic clutch actuating cylinder rotatable with one of said members and defining clutch-engaging and clutch-releasing chambers, controllable valve means connected to a source of hydraulic fluid under pressure and to the said chambers, the valve means being operable to a clutch-engaging position in which it supplies fluid to both chambers, the valve means including means for maintaining a predetermined static pressure differential in the engaging chamber over that in the releasing chamber to provide static thrust to engage the clutch, and means responsive to the rotational speed of the cylinder connected to the releasing chamber for at least partially emptying the clutch-releasing chamber above a predetermined rotational speed of the cylinder so that centrifugal hydrostatic forces in the cylinder are unbalanced and provide thrust in the clutch-engaging direction, the cylinder being so proportioned with regard to the said static pressure differential that the thrust due to centrifugal force at the said predetermined speed is substantially greater than the thrust due to the static pressure differential, whereby centrifugal force maintains the clutch in engagement and substantially increases the torque capacity thereof at speeds above the said predetermined speed.

14. In combination, a driving shaft, a driven shaft, a friction clutch between the shafts adapted to couple the shafts during rotation of the driving shaft, first hydraulic motor means to engage the clutch, second hydraulic motor means to disengage the clutch, the motor means acting in opposition, valve means connected to the motor means for distributing fluid to both the motor means and adapted to maintain a predetermined pressure differential between the motor means to engage or release the clutch, the motor means being mounted for rotation with one of the shafts so that rotation thereof develops centrifugal fluid forces on the fluid in the motor means, the motor means being so proportioned that the thrust due to centrifugal forces in each motor means substantially balances that in the other motor means when the motor means are filled with fluid, and means responsive to rotational speed of the driven shaft to empty partially one of said motor means of fluid after engagement of the clutch to unbalance the thrusts due to centrifugal force and thereby modify the torque capacity of the clutch.

15. In combination, a driving shaft, a driven shaft, a friction clutch between the shafts adapted to couple the shafts during rotation of the driving shaft, first hydraulic motor means to engage the clutch, second hydraulic motor means to disengage the clutch, the motor means acting in opposition, valve means connected to the motor means for distributing fluid to both the motor means and adapted to maintain a predetermined pressure differential between the motor means to engage or release the clutch, the motor means being mounted for rotation with one of the shafts so that rotation thereof develops centrifugal fluid forces on the fluid in the motor means and thereby develops opposed thrusts in the two motor means, and means responsive to rotational speed of the motor means to empty partially one of said motor means of fluid after engagement of the clutch to modify the net thrust due to centrifugal force and thereby modify the torque capacity of the clutch.

16. In combination, a driving shaft, a driven shaft, a friction clutch between the shafts adapted to couple the shafts during rotation of the driving shaft, first hydraulic motor means to engage the clutch, second hydraulic motor means to disengage the clutch, valve means connected to the motor means for distributing fluid to both the motor means and adapted to maintain a predetermined pressure differential between the motor means to engage or release the clutch, the motor means being mounted for rotation with one of the shafts so that rotation thereof develops centrifugal fluid forces on the fluid in the motor means, the motor means being so proportioned that the thrust due to centrifugal forces in each motor means substantially balances that in the other motor means when the motor means are filled with fluid, and means responsive to rotational speed of the driving shaft to empty partially the second motor means of fluid after filling the first motor means to unbalance the thrusts due to centrifugal force and thereby increase the torque capacity of the clutch.

17. A clutch comprising a driving member, a driven member, a friction clutch between the members, a hydraulic cylinder assembly rotatable with one of the members and coaxial therewith, the cylinder assembly being coupled to the clutch to effect engagement and release thereof and defining a clutch-engaging chamber and a clutch-releasing chamber, means for supplying fluid under pressure selectively to the chambers, a passage from the releasing chamber remote from the axis, and a relief valve normally closing the passage including a valve member movable to open the passage, the valve member being exposed to and biased by the pressure of fluid in the passage and moved thereby to open the passage when the pressure exceeds the setting of the relief valve.

18. A clutch comprising an inner drum, an outer drum, a first set of clutch plates splined to the inner drum, a second set of clutch plates splined to the outer drum, the plates of the two sets being interleaved, means for forcing the clutch plates into frictional engagement, and a fluid chamber within the inner drum; the inner drum being formed with longitudinally and circumferentially spaced passages for the conduction of fluid from the chamber to the clutch plates, one face of each pair of engaging clutch faces being formed with radial channels for conduction of fluid, and the outer drum being provided with peripheral fluid outlets; means responsive to actuation of the engagement-forcing means for supplying a cooling and lubricating fluid to the chamber concurrently with actuation of the engagement-forcing means; and means responsive to a condition indicative of synchronization of the drums for terminating the supply of fluid upon substantial synchronization of the drums.

19. In combination, a friction clutch comprising driving and driven members, a double-acting hydraulic clutch actuating cylinder rotatable with one of said members and defining clutch-engaging and clutch-releasing chambers, controllable valve means connected to a source of hydraulic fluid under pressure and to the said chambers, the valve means being operable to a clutch-engaging position in which it supplies fluid to both chambers, the valve means including means for maintaining a predetermined static pressure differential in the engaging chamber over that in the releasing chamber to provide static thrust to engage the clutch, and means responsive to the rotational speed of the cylinder connected to the releasing chamber for at least partially emptying the clutch-releasing chamber above a predetermined rotational speed of the cylinder so that centrifugal hydrostatic forces in the cylinder are unbalanced and provide thrust in the clutch-engaging direction.

20. A clutch comprising, in combination, a driving member, a driven member, means for engaging and disengaging the clutch, and means for supplying cooling and lubricating fluid to the clutch during the period of slip after engagement of the clutch is initiated including a source of cooling and lubricating fluid, a conduit connecting the source to the clutch, a valve in the conduit external to the clutch, means repsonsive to initiation of engagement of the clutch for opening the valve, and means responsive to substantial synchronization of the said members for closing the valve.

21. A clutch as recited in claim 20 in which the last-named means includes a device responsive to the speed of the driven member connected to the valve to close the valve.

22. In combination, a driving shaft, a driven shaft, a friction clutch between the shafts adapted to couple the shafts during rotation of the driving shaft, a double acting hydraulic motor rotatable with one of the shafts including a clutch-engaging chamber and a clutch-disengaging chamber for providing thrust to engage and disengage the clutch, means for supplying hydraulic fluid under predetermined pressure independent of the speeds of the shafts to the clutch-engaging chamber of the motor and under a lower predetermined pressure independent of the speeds of the shafts to the clutch disengaging chamber of the motor to provide a predetermined thrust adapted to engage the clutch with relatively light friction, and means for subsequently increasing the effective pressure of the fluid in the motor, to thereby largely increase the thrust thereof and thereby increase the friction of the clutch to provide full-load torque-carrying capacity, including means responsive to the speed of rotation of the motor for partially emptying the clutch-disengaging chamber of the motor.

23. A combination as recited in claim 22 in which the motor is rotatable with the driving shaft.

24. In combination, a driving shaft, a driven shaft, a friction clutch between the shafts adapted to couple the shafts during rotation of the driving shaft, a double acting hydraulic motor rotatable with one of the shafts including a clutch-engaging chamber and a clutch-disengaging chamber for providing thrust to engage and disengage the clutch, means for supplying hydraulic fluid under predetermined pressure independent of the speeds of the shafts to the clutch-engaging chamber of the motor and under a lower predetermined pressure independent of the speeds of the shafts to the clutch-disengaging chamber of the motor to provide a predetermined thrust adapted to engage the clutch with relatively light friction, and means responsive to substantial termination of slip of the clutch upon engagement thereof for partially emptying the clutch-disengaging chamber of the motor and thus increasing the effective pressure of the fluid in the motor, to thereby largely increase the thrust thereof and thereby increase the friction of the clutch to provide full-load torque-carrying capacity.

25. In combination, a driving shaft, a driven shaft, a friction clutch between the shafts adapted to couple the shafts during rotation of the driving shaft, a double acting hydraulic motor rotatable with one of the shafts including a clutch-engaging chamber and a clutch-disengaging chamber for providing thrust to engage and disengage the clutch, means for applying hydraulic fluid under predetermined pressure independent of the speeds of the shafts to the clutch-engaging chamber of the motor and under a lower predetermined pressure independent of the speeds of the shafts to the clutch-disengaging chamber of the motor to provide a predetermined thrust adapted to engage the clutch with relatively light friction, and means for subsequently increasing the effective pressure of the fluid in the motor, to thereby largely increase the thrust thereof and thereby increase the friction of the clutch to provide full-load torque carrying capacity, including a valve connected to the clutch-disengaging chamber actuatable to empty at least partially the clutch-disengaging chamber including means responsive to rotation of one of the shafts above a predetermined speed for actuating the valve.

26. A combination as recited in claim 25 in which the last-recited means is responsive to rotation of the driving shaft.

27. In combination, a driving shaft, a driven shaft, a friction clutch between the shafts adapted to couple the shafts during rotation of the driving shaft, means to engage the clutch, a hydraulic motor for providing thrust to disengage the clutch, the motor including an expansible chamber rotatable with one of the said shafts and being filled with fluid during initial engagement of the clutch, and means for increasing the net clutch engaging force and thereby the friction of the clutch to provide increased torque carrying capacity above that available during initial engagement of the clutch, the means for increasing the clutching force comprising a bleed opening in the expansible chamber spaced from the axis of the shaft, means for supplying fluid to the chamber at a rate at least equal to the rate of loss of fluid through the bleed opening, and means responsive to engagement of the clutch to terminate the said supply of fluid after initial engagement of the clutch so that the chamber is at least partially emptied through the said bleed opening.

28. A combination as recited in claim 27 in which the last-recited means is responsive to rotation of the driven shaft.

29. A clutch comprising a driving member, a driven member, a friction clutch between the members, an annular hydraulic cylinder assembly rotatable with one of the members and coaxial therewith, the cylinder assembly being coupled to the clutch to effect engagement and release thereof and defining a clutch-engaging chamber and a clutch-releasing chamber, means for supplying fluid under pressure selectively to the chambers, a restricted vent for the engaging chamber substantially radially within the inner radius of the engaging chamber so that the chamber is maintained substantially full of fluid by centrifugal force when the cylinder is rotating, a passage from the releasing chamber intermediate between the inner and outer radii of the releasing chamber so as to allow flow of fluid from the portion of the releasing chamber between the inner radius thereof and the radius to the passage under the effect of centrifugal force when the cylinder is rotating, and a valve opened in response to centrifugal force developed by rotation of the cylinder controlling the said passage.

30. A clutch comprising a driving member, a driven member, a friction clutch between the members, an annular hydraulic cylinder assembly rotatable with one of the members and coaxial therewith, the cylinder assembly being coupled to the clutch to effect engagement and release thereof and defining a clutch-engaging chamber and a clutch-releasing chamber, means for supplying fluid under pressure selectively to the chambers, a restricted constantly open vent for the engaging chamber substantially radially within the inner radius of the engaging chamber so that the chamber is maintained substantially full of fluid by centrifugal force when the cylinder is rotating, a restricted outlet from the releasing chamber intermediate between the inner and outer radii of the releasing chamber so as to allow flow of fluid from the releasing chamber radially within the radius to the outlet under the effect of centrifugal force when the cylinder is rotating, makeup means for supplying fluid to the engaging chamber at a rate sufficient to balance flow through the outlet, and means for terminating operation of the makeup means.

References Cited in the file of this patent

UNITED STATES PATENTS

| Number | Name | Date |
|---|---|---|
| 1,682,358 | Sperry | Aug. 28, 1928 |
| 1,859,280 | Corbin | May 24, 1932 |
| 1,928,301 | Pierson | Sept. 26, 1933 |
| 2,178,017 | Fedden et al. | Oct. 31, 1939 |
| 2,288,274 | Ewaldson | June 30, 1942 |
| 2,328,090 | Nutt et al. | Aug. 31, 1943 |
| 2,381,786 | Tyler | Aug. 7, 1945 |
| 2,386,220 | Lawler et al. | Oct. 9, 1945 |
| 2,407,699 | Hill | Sept. 17, 1946 |
| 2,409,551 | Donnellan | Oct. 15, 1946 |
| 2,437,430 | Lawrence | Mar. 9, 1948 |
| 2,469,238 | Newton | May 3, 1949 |
| 2,482,460 | Browne | Sept. 20, 1949 |
| 2,483,073 | Strub | Sept. 27, 1949 |
| 2,516,544 | Breeze | July 25, 1950 |
| 2,521,239 | McDowall et al. | Sept. 5, 1950 |
| 2,523,501 | Davies et al. | Sept. 26, 1950 |
| 2,547,660 | Prince | Apr. 3, 1951 |
| 2,562,515 | Wemp | July 31, 1951 |
| 2,567,581 | Salter | Sept. 11, 1951 |
| 2,632,544 | Hockert | Mar. 24, 1953 |
| 2,690,248 | McDowall | Sept. 28, 1954 |

FOREIGN PATENTS

| Number | Country | Date |
|---|---|---|
| 150,301 | Great Britain | Oct. 7, 1920 |
| 384,836 | Great Britain | Dec. 15, 1932 |
| 495,469 | Great Britain | Dec. 15, 1938 |
| 579,061 | Germany | June 2, 1933 |
| 938,374 | France | Apr. 5, 1948 |